US012431807B2

United States Patent
Lin et al.

(10) Patent No.: US 12,431,807 B2
(45) Date of Patent: Sep. 30, 2025

(54) SWITCHING POWER CONVERTER HAVING FIXED FREQUENCY DURING CURRENT LIMIT OPERATION AND CONTROL CIRCUIT AND METHOD

(71) Applicant: Richtek Technology Corporation, Zhubei (TW)

(72) Inventors: Fu-To Lin, Hsinchu (TW); Chang-Jung Fu, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 298 days.

(21) Appl. No.: 18/325,022

(22) Filed: May 29, 2023

(65) Prior Publication Data
US 2024/0223069 A1 Jul. 4, 2024

Related U.S. Application Data

(60) Provisional application No. 63/477,386, filed on Dec. 28, 2022.

(51) Int. Cl.
*H02M 3/158* (2006.01)
*H02M 1/00* (2006.01)

(52) U.S. Cl.
CPC ....... *H02M 3/1584* (2013.01); *H02M 1/0032* (2021.05); *H02M 3/158* (2013.01)

(58) Field of Classification Search
CPC .. H02M 3/158; H02M 3/1584; H02M 1/0032; H02M 3/1566; H02M 1/32
See application file for complete search history.

(56) References Cited

U.S. PATENT DOCUMENTS

| 2018/0337599 | A1* | 11/2018 | Chen | H02M 3/158 |
| 2022/0209658 | A1* | 6/2022 | Bafna | H03K 5/24 |
| 2022/0311336 | A1* | 9/2022 | You | H02M 3/158 |
| 2022/0393588 | A1* | 12/2022 | Bafna | H02M 1/0845 |

FOREIGN PATENT DOCUMENTS

TW 200934074 A 8/2009

* cited by examiner

*Primary Examiner* — Alex Torres-Rivera
(74) *Attorney, Agent, or Firm* — Tung & Associates

(57) ABSTRACT

A switching power converter for converting an input power to an output power includes a power stage; and a conversion control circuit which includes: a current limit control circuit for comparing a current monitor signal and a sensing signal limit threshold to generate a current limit control signal, wherein the current monitor signal is related to an output current of the output power; and a PWM control circuit for generating a PWM signal according to an output voltage of the output power for controlling the power stage to generate the output power. The first state of the PWM signal has a first constant time. When the current limit control signal indicates that the output current exceeds a current limit threshold, the PWM control circuit controls a switching frequency of the PWM signal to operate at a fixed frequency. The fixed frequency is lower than a predetermined frequency limit.

27 Claims, 9 Drawing Sheets

SWITCHING POWER CONVERTER HAVING FIXED FREQUENCY DURING CURRENT LIMIT OPERATION AND CONTROL CIRCUIT AND METHOD

CROSS REFERENCE

The present invention claims priority to the provisional application Ser. No. 63/477,386, filed on Dec. 28, 2022, which application is incorporated herein by its reference in its entirety.

BACKGROUND OF THE INVENTION

Field of Invention

The present invention relates to a switching power converter; particularly, it relates to a switching power converter having fixed switching frequency during current limit operation. The present invention also relates to a conversion control circuit and a method for controlling the switching power converter having fixed switching frequency during current limit operation.

Description of Related Art

Current limit is required in most switching power converter for instantaneous current protection to prevent output current from exceeding expected value and damaging components or input power source. The benefit of current limit is that switching power converter remains in operation instead of shutdown when current limit is triggered, and the switching power converter can recover to normal operation after current limit releases without the need of power sequence recycling.

FIG. 1A shows a prior art switching power converter. In FIG. 1A, the switching power converter 900 includes a PWM control circuit 91 and a power stage circuit 92. The switching power converter 900 is configured to convert an input voltage Vin to an output voltage Vo for supplying power to a load which has a load current Iload. The power stage circuit 92 includes one or plural power stages and is configured to generate an output current Iout. Each of the plural power stages has an inductor and plural switches. The output current Iout is the total current through one or plural inductors. The PWM control circuit 91 is configured to generate a PWM signal to control the power stage circuit 92 according to a feedback signal VF related to the output voltage Vo, a current monitor signal VIS related to the output current Iout, and a ramp signal VRA. The current limit control signal VCLC indicates when the output current Iout exceeds the current limit threshold Ith.

FIG. 1B shows waveforms corresponding to the switching power converter in FIG. 1A. During steady state operation (before t1), the ramp signal VRA and the feedback signal VF intersect at a reference level VRE (dotted line), and the PWM signal is triggered regularly. Just before the time point t1, the load current ILoad steps up to a higher level and triggers the current limit operation. During the current limit operation (t1~t2), the feedback signal VF shifts and saturates at a high level due to output voltage drop. When the output current Iout drops below current limit threshold, the current limit condition is released and the PWM signal starts to be triggered again.

As shown in FIG. 1B, a drawback of the prior art is that the output current Iout has a subharmonic. Specifically, the PWM signal is prompt to consecutively triggered due to the high level of the feedback signal VF, causing large output current ripple. The output current Iout thus reaches current limit threshold, which triggers current limit and halts the PWM signal again.

Another drawback of the prior art is that when the power stage circuit 92 includes plural power stages, current limit by per-phase sensing requires NTC thermistors and comparator circuits for each phase, which increases external BOM (bill of material) cost and die area. Furthermore, the sensed current information can be disturbed by parasitic resistor on the current sensing path, which results in inaccurate per-phase signal and incorrect current limit threshold.

Compared to the prior art switching power converter above, the present invention proposes a novel switching power converter which is capable of improving the subharmonic of the output current and saving external BOM cost and die area. According to the present invention, the PWM signal is adjusted by adjusting the feedback signal related to the output current and the output voltage, such that subharmonic of the output current is avoided. Another advantage of the proposed switching power converter is that it requires only one current limit comparator and is applicable in common-N sum current structure, which further reduces the die area and costs of current limit.

SUMMARY OF THE INVENTION

From one perspective, the present invention provides a conversion control circuit, configured to operably control a switching power converter to convert an input power to an output power, comprising: a current limit control circuit, configured to compare a current monitor signal and a sensing signal limit threshold to generate a current limit control signal, wherein the current monitor signal is related to an output current of the output power; and a pulse width modulation (PWM) control circuit, configured to operably generate a PWM signal according to an output voltage of the output power for controlling a power stage to generate the output power, wherein a first state of the PWM signal has a first constant time; wherein the current limit control circuit is further configured to operably control a second state of the PWM signal, such that when the current limit control signal indicates that the output current exceeds a current limit threshold, the PWM control circuit controls a switching frequency of the PWM signal to operate at a fixed frequency, wherein the fixed frequency is lower than a predetermined frequency limit.

In one preferred embodiment, the PWM control circuit includes: a modulation comparator, configured to operably compare a ramp signal and a first feedback control signal to generate a PWM trigger signal; a constant time control circuit, configured to operably count the first constant time for controlling the first state of the PWM signal according to the PWM trigger signal; and a feedback control circuit, configured to operably generate a second feedback control signal according to the output voltage; wherein the second feedback control signal is adjusted to generate the first feedback control signal such that when the current limit control signal indicates that the output current exceeds the current limit threshold, the switching frequency of the PWM signal operates at a fixed frequency.

In one preferred embodiment, the current limit control circuit includes: an adjusting circuit, configured to operably generate an adjusting signal according to the output voltage and the output current when the output current exceeds the current limit threshold, wherein the first feedback control signal is a sum of the second feedback signal and the adjusting signal, whereby the second state of the PWM signal is controlled to have a second constant time, such that the switching frequency is at the fixed frequency.

In one preferred embodiment, the conversion control circuit further comprises a current sense circuit configured to sense an inductor current of the power stage to generate the current monitor signal; wherein the current limit control circuit further includes a current limit comparator which is configured to compare the current monitor signal and the sensing signal limit threshold to generate the current limit control signal.

In one preferred embodiment, the adjusting signal is proportional to the output voltage and inversely proportional to the output current.

In one preferred embodiment, the fixed frequency is proportional to the current limit threshold and the output voltage and inversely proportional to an input voltage of the input power and the first constant time.

In one preferred embodiment, the switching frequency, during a transient of the output current before exceeding the current limit threshold, is proportional to the output current.

In one preferred embodiment, when the output current exceeds across the current limit threshold, the switching frequency decreases to the fixed frequency.

In one preferred embodiment, the switching power converter is a multi-phase power converter which includes plural power stages switching in interleaving with each other, wherein each of the plural power stages includes an inductor for switching power conversion; wherein the output current is determined by a summed current of an inductor current of each of the plural power stages.

In one preferred embodiment, the current limit control circuit further includes a current sense circuit, configured to sense the inductor current of each of the plural power stages to generate a plurality of per-phase current sense signals; wherein the current sense circuit further sums up a plurality of the per-phase current sense signals of the plural power stages to generate a summed current sense signal; wherein the summed current sense signal is coupled to one single temperature dependent device to generate the current monitor signal, whereby a temperature coefficient of the inductor of each of the plural power stages is compensated.

From another perspective, the present invention provides a switching power converter, configured to operably convert an input power to an output power, comprising: a power stage including at least one switch configured to control an inductor; and a conversion control circuit including: a current limit control circuit, configured to compare a current monitor signal and a sensing signal limit threshold to generate an current limit control signal, wherein the current monitor signal is related to an output current of the output power; and a pulse width modulation (PWM) control circuit, configured to operably generate a PWM signal according to an output voltage of the output power for controlling the power stage to generate the output power, wherein a first state of the PWM signal has a first constant time; wherein when the current limit control signal indicates that the output current exceeds a current limit threshold, the PWM control circuit controls a switching frequency of the PWM signal to operate at a fixed frequency, wherein the fixed frequency is lower than a predetermined frequency limit.

From another perspective, the present invention provides A method for controlling a switching power converter, wherein the switching power converter is configured to operably convert an input power to an output power and includes a power stage including at least one switch configured to control an inductor; the method comprising: comparing a current monitor signal and a sensing signal limit threshold to generate an current limit control signal, wherein the current monitor signal is related to an output current of the output power; and generating a PWM signal according to an output voltage of the output power for controlling the power stage circuit to generate the output power, wherein a first state of the PWM signal has a first constant time; wherein when the current limit control signal indicates that the output current exceeds a current limit threshold, controlling a switching frequency of the PWM signal to operate at a fixed frequency, wherein the fixed frequency is lower than a predetermined frequency limit.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
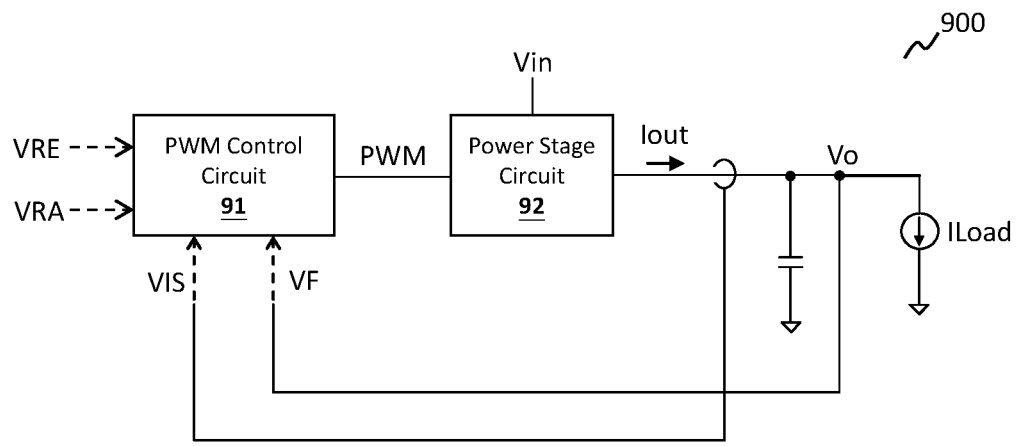
FIG. 1A shows a prior art switching power converter.
Figure 1B:
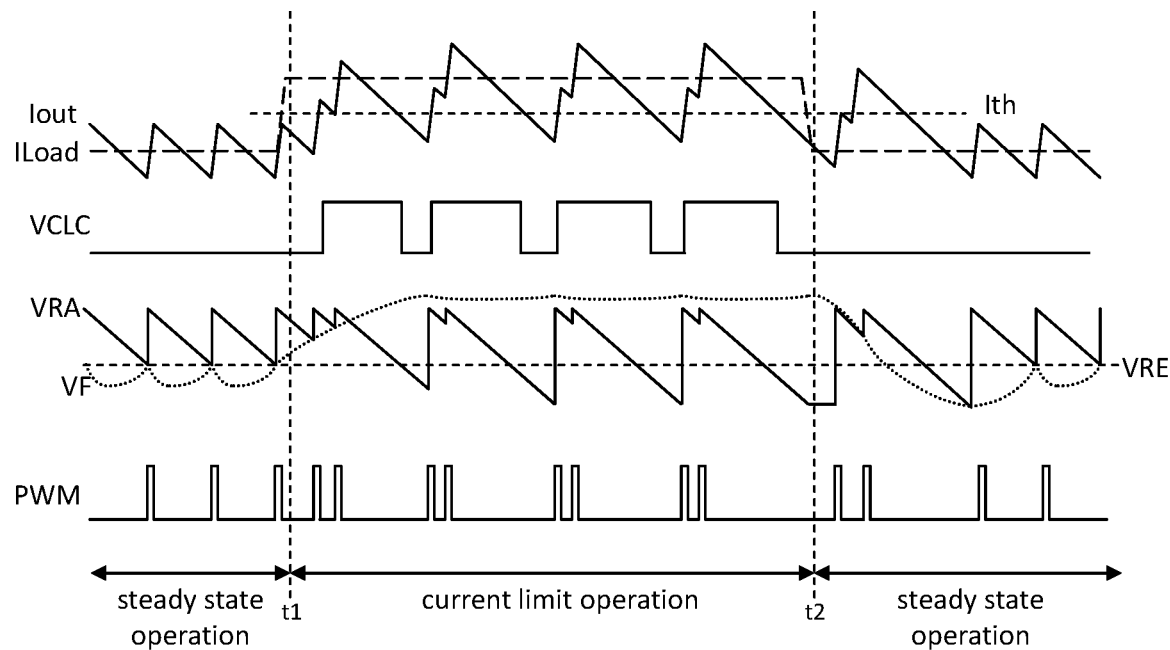
FIG. 1B shows waveforms corresponding to the switching power converter in FIG. 1A.
Figure 2A:
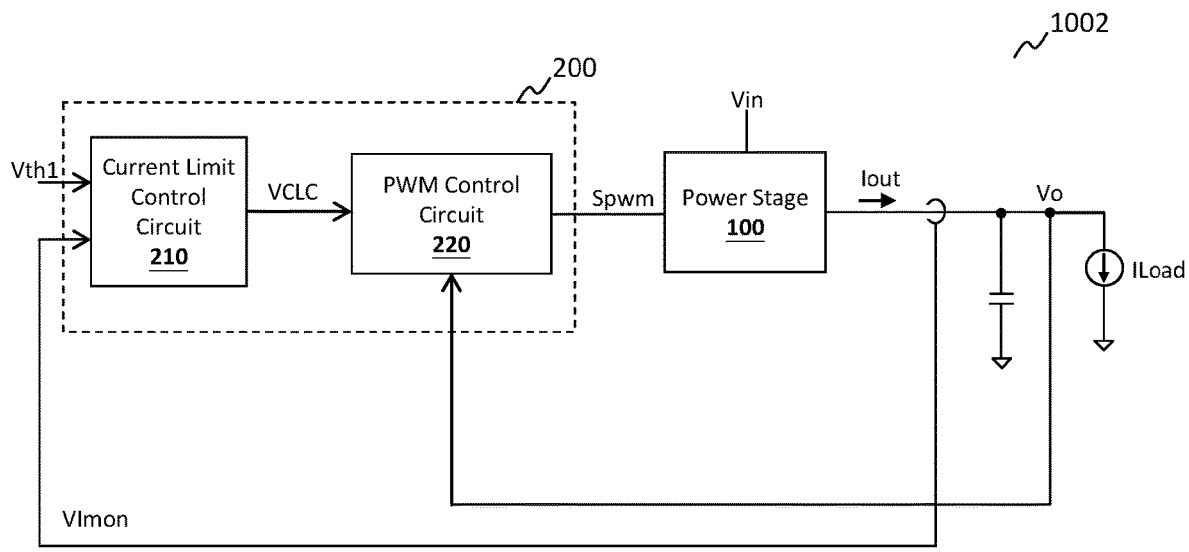
FIG. 2A shows a block diagram of one embodiment of the switching power converter according to the present invention.

FIG. 2A shows a block diagram of one embodiment of the switching power converter according to the present invention. In one embodiment, as shown in FIG. 2A, the switching power converter 1002 is configured to operably convert an input power to an output power, which comprises a power stage 100 and a conversion control circuit 200. The conversion control circuit 200 includes a current limit control circuit 210 and a pulse width modulation (PWM) control circuit 220.

In one embodiment, the power stage 100 includes at least one switch configured to switch an inductor for power conversion. In one embodiment, the current limit control circuit 210 is configured to compare a current monitor signal VImon and a sensing signal limit threshold Vth1 to generate an current limit control signal VCLC. In one embodiment, the current monitor signal VImon is related to an output current Iout of the output power. The sensing signal limit threshold Vth1 is related to a current limit threshold Ith of the output current Iout.

In one embodiment, the PWM control circuit 220 is configured to operably generate a PWM signal Spwm according to an output voltage Vo of the output power for controlling the power stage 100 to generate the output power during normal operation.

Figure 2B:
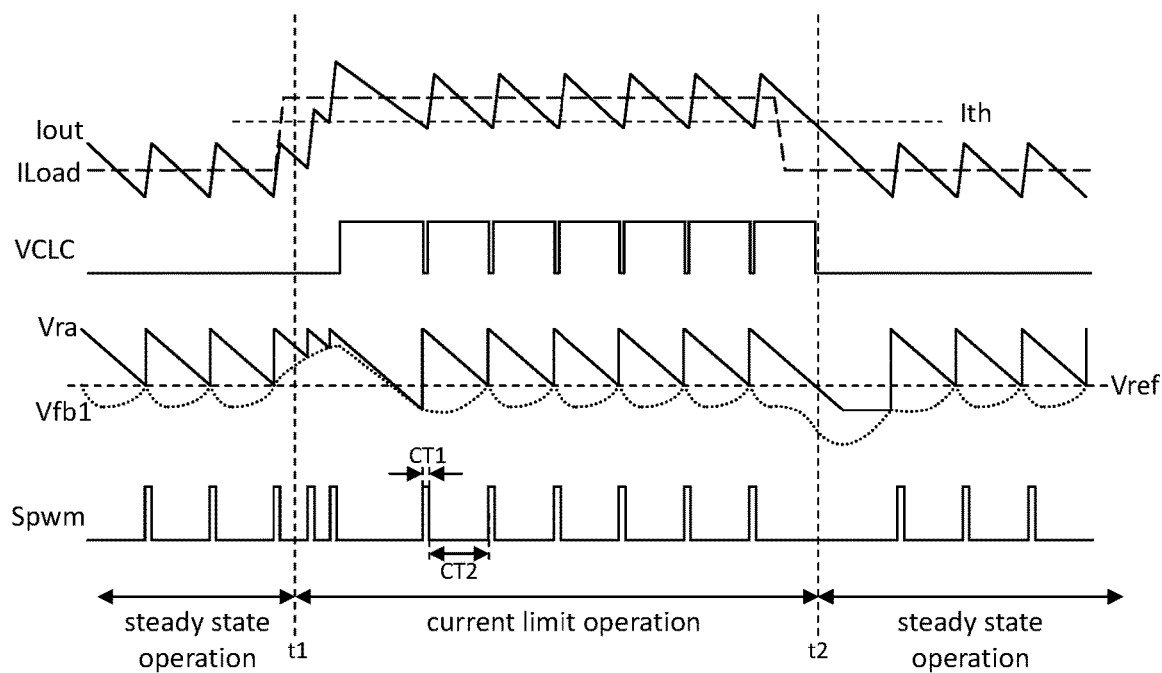
FIG. 2B shows waveforms corresponding to the switching power converter shown in FIG. 2A according to the embodiment of the present invention.

FIG. 2B shows waveforms corresponding to the switching power converter shown in FIG. 2A according to the embodiment of the present invention. In one embodiment, during the current limit operation (t1~t2) as shown in FIG. 2B, the PWM control circuit 220 is further configured to operably control a first state of the PWM signal Spwm to have a first constant time. Note that, in this embodiment, the first state is ON state, and the first constant time is constant ON-time (e.g. CT1). However, this is not for limiting the scope of the present invention. In another embodiment, the first state can alternatively be OFF state, and the first constant time can alternatively be constant OFF-time.

In one embodiment, during the current limit operation (t1~t2) as shown in FIG. 2B, wherein the current limit control circuit 210 is further configured to operably control a second state of the PWM signal Spwm. In this embodiment, the second state is OFF state. Note that this is not for limiting the scope of the present invention, either.

Figure 3:
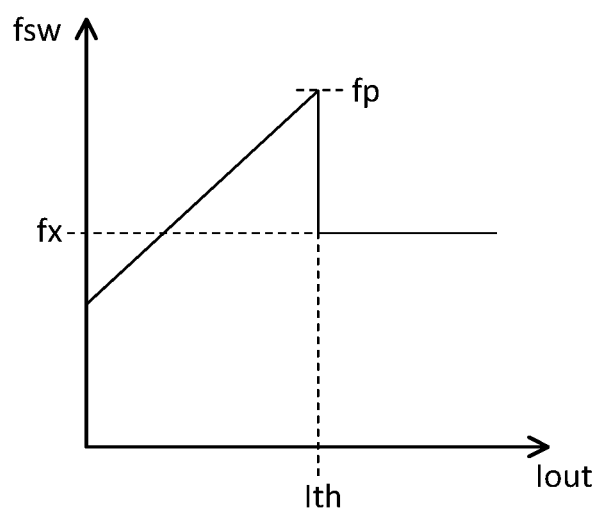
FIG. 3 shows the characteristic curve of the switching frequency of the PWM signal corresponding to the output current according to the embodiment of the present invention.

FIG. 3 shows the relation curve between the switching frequency of the PWM signal and the output current in FIG. 2A according to the embodiment of the present invention. In one embodiment, when the current limit control signal VCLC indicates that the output current Iout exceeds a current limit threshold Ith, the PWM control circuit 220 controls a switching frequency fsw of the PWM signal Spwm to operate at a fixed frequency fx. Note that, as shown in FIG. 3, the fixed frequency fx is lower than a predetermined frequency limit fp, such that the output current Iout is stable without current ripple, and that the output current Iout has no subharmonic. In one embodiment, before the output current Iout exceeds the current limit threshold Ith, the switching frequency fsw is positively related to the output current Iout.

In one embodiment, the fixed frequency fx is proportional to the current limit threshold Ith and the output voltage Vo, and is inversely proportional to an input voltage Vin of the input power in FIG. 2A and the first constant time (CT1) in FIG. 2B. The fixed frequency fx is expressed as:

$$fx = \frac{k \cdot Ith \cdot Vo}{Vin \cdot CT1}$$

Figure 4:
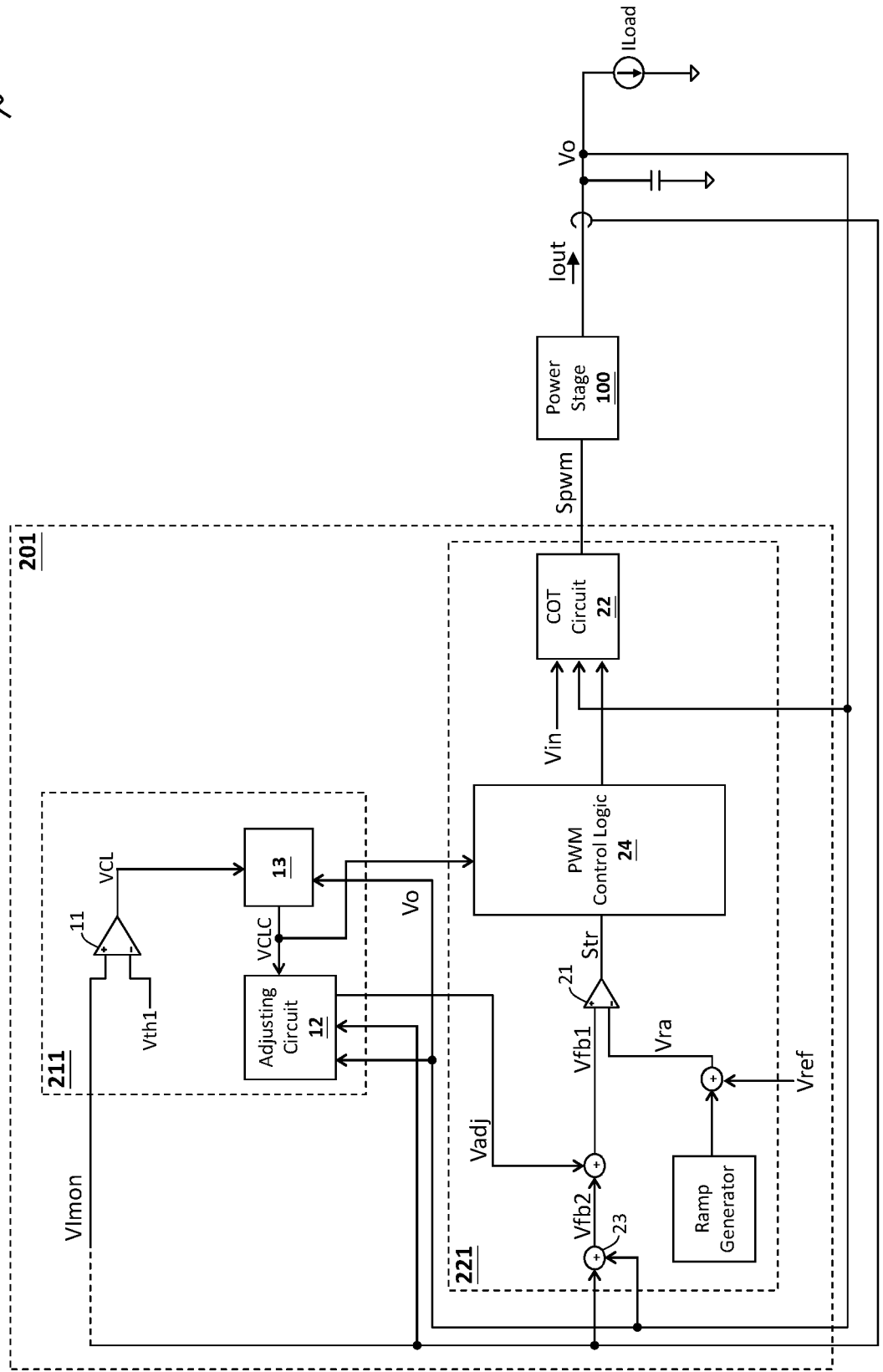
FIG. 4 shows a block diagram of one embodiment of the switching power converter according to the present invention.

FIG. 4 shows a block diagram of one embodiment of the switching power converter (1004) according to the present invention. As shown in FIG. 4, In one embodiment, the conversion control circuit 201 of the switching power converter 1004 includes the current limit control circuit 211 and the PWM control circuit 221. The current limit control circuit 211 includes a current limit comparator 11, an adjusting circuit 12 and a determining circuit 13. In this embodiment, the current limit comparator 11 is configured to compare the current monitor signal VImon and the sensing signal limit threshold Vth1 to generate an current limit signal VCL. The determining circuit 13 is configured to operably generate the current limit control signal VCLC according to the output voltage Vo and the current limit signal VCL. From one perspective, the current limit control signal VCLC is configured to indicate the current limit condition and the release of the current limit condition. The adjusting circuit 12 is configured to operably generate an adjusting signal Vadj according to the output voltage Vo, the output current Iout and the current limit control signal VCLC when the output current Iout exceeds the current limit threshold.

In one embodiment, the PWM control circuit 221 includes: a modulation comparator 21, a constant time control circuit (COT circuit 22) and a feedback control circuit 23. In one embodiment, the modulation comparator 21 is configured to operably compare a ramp signal Vra and a first feedback control signal Vfb1 to generate a PWM trigger signal Str. The ramp signal Vra is related to a reference voltage Vref. In one embodiment, a ramp signal level of the ramp signal Vra is shifted by the reference voltage Vref. The COT circuit 22 is triggered by the PWM trigger signal Str to count the first constant time for controlling the first state of the PWM signal Spwm. The feedback control circuit 23 is configured to operably generate a second feedback control signal Vfb2 according to the output voltage Vo and the output current Iout. In one embodiment, the second feedback control signal Vfb2 is configured to control the switching power converter to operate in a peak current mode during normal operation. In one embodiment in FIG. 4, the first feedback control signal Vfb1 is a sum of the second feedback control signal Vfb2 and the adjusting signal Vadj, whereby the second state of the PWM signal is controlled to have a second constant time (e.g. CT2 in FIG. 2B), such that the switching frequency fsw is at the fixed frequency fx.

Please refer to FIG. 2B and FIG. 4. As shown in FIG. 2B, at the time point t1, the output current Iout rises as the load current Iload increases. When the current limit control signal VCLC indicates that the output current Iout exceeds the current limit threshold Ith (during the current limit operation, i.e. t1~t2), the adjusting circuit 12 generates the adjusting signal Vadj to adjust the second feedback control signal Vfb2, such that the PWM signal Spwm is not prompt to consecutively triggered, whereby the output current Iout will have no subharmonic. The PWM signal Spwm is, instead, controlled to operate in fixed frequency during current limit operation by the adjusting circuit 12 and the PWM control logic 24 to avoid consecutive Spwm triggering that cause large output voltage ripple.

Specifically, during current limit operation (t1~t2 in FIG. 2B), the current limit control signal VCLC turns to high level, and the adjusting circuit 12 injects the adjusting signal Vadj to the second feedback control signal Vfb2. Note that, the adjusting signal Vadj is proportional to output voltage Vo and is inversely proportional to the output current Iout, so as to cancel the effect of the second feedback control signal Vfb2 during current limit operation. As a result, the first feedback control signal Vfb1 is adjusted to a regular level which is equivalent to the trigger level during steady state operation (before t1 in FIG. 2B) regardless of the output voltage Vo drop.

At the time point t2 in FIG. 2B, the output current Iout decreases as the load current Iload decreases. When the output current Iout reduces to be lower than the current limit threshold Ith, the adjusting circuit 12 stops adjusting the second feedback control signal second feedback control signal Vfb2 according to the current limit control signal VCLC, and the PWM control logic 24 controls the PWM signal Spwm to return to the steady state operation according to the current limit control signal VCLC.

Figure 5:
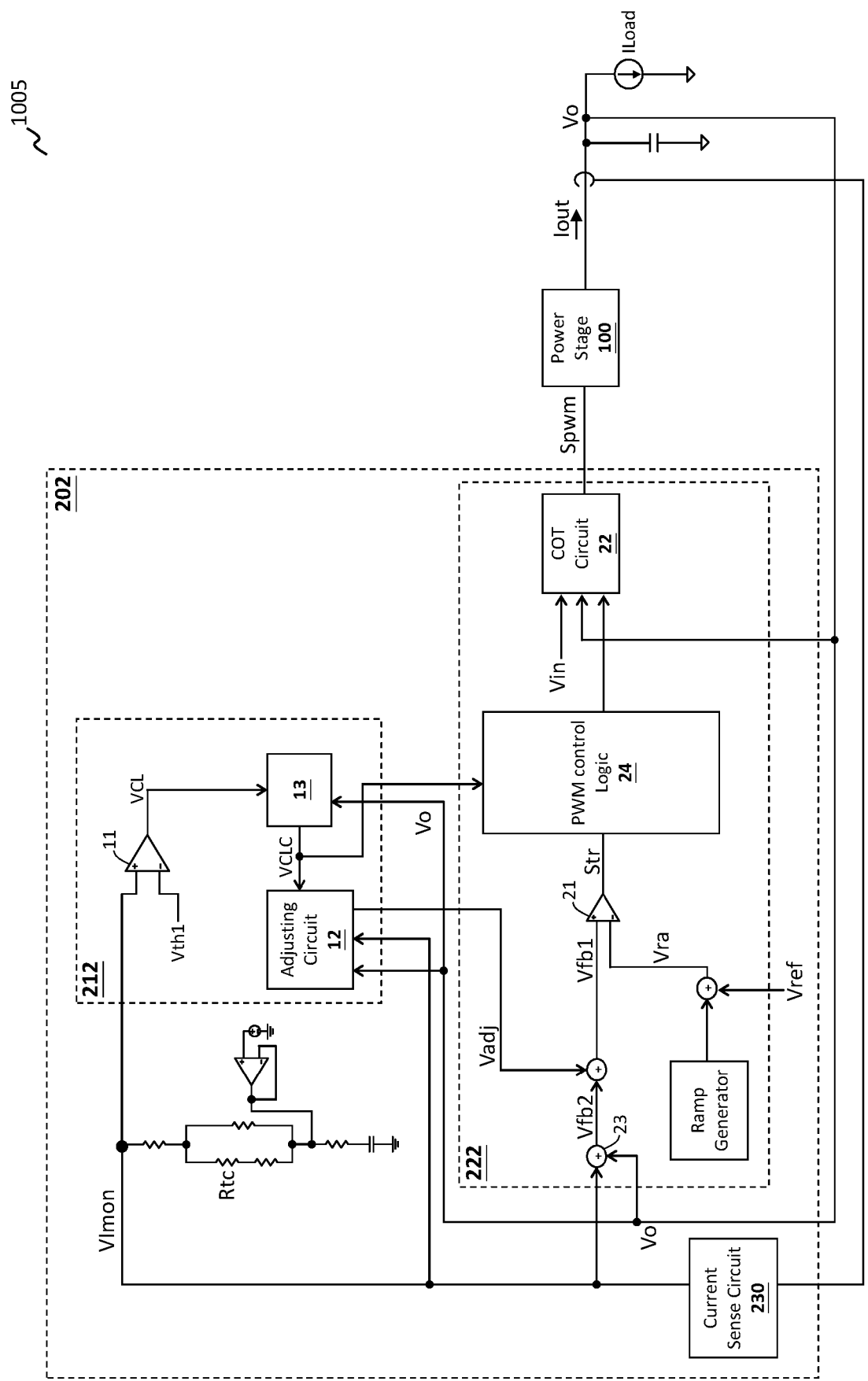
FIG. 5 shows a block diagram of one embodiment of the switching power converter according to the present invention.

FIG. 5 shows a block diagram of one embodiment of the switching power converter (1005) according to the present invention. As shown in FIG. 5, In one embodiment, the conversion control circuit 202 of the switching power converter 1005 further includes a current sense circuit 230 and one single temperature dependent device. The current sense circuit 230 is configured to sense an inductor current of the power stage 100 to generate the current monitor signal VImon. In this embodiment, the one single temperature dependent device is for example a Negative Temperature Coefficient (NTC) thermistor Rtc.

Figure 6A:
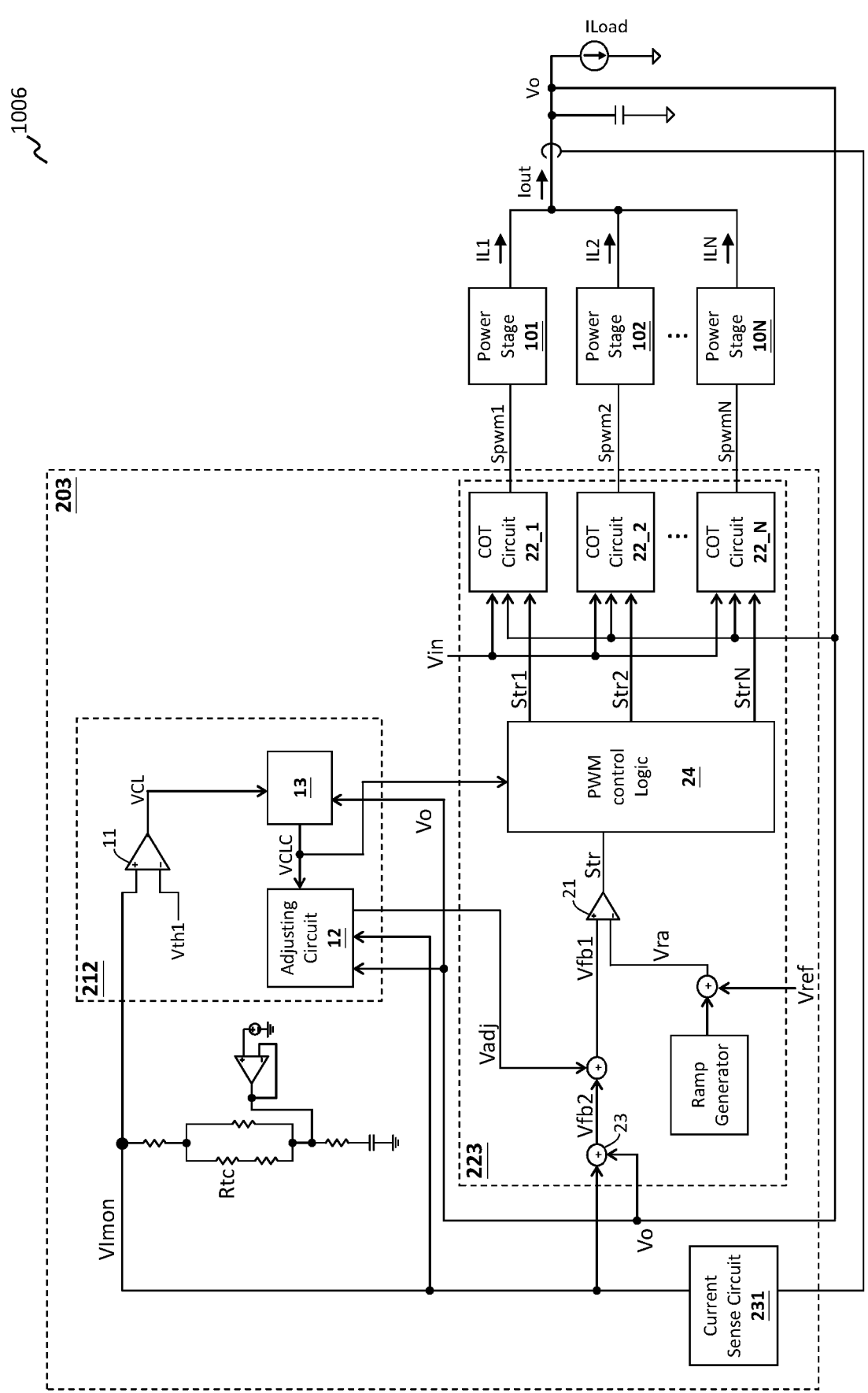
FIG. 6A shows a block diagram of one embodiment of the switching power converter according to the present invention.

FIG. 6A shows a block diagram of one embodiment of the switching power converter (1006) according to the present invention. As shown in FIG. 6A, In one embodiment, the switching power converter 1006 is a multi-phase power converter which includes plural power stages (power stage 101~10N) switching in interleaving with each other. Each of the plural power stages includes an inductor for switching power conversion. In this embodiment, the output current Iout is a summed current of inductor currents of all of the plural power stages.

Specifically, the output current Iout in FIG. 6A is the summed current of the inductor currents IL1~ILN corresponding to the power stage 101~10N respectively. The PWM control circuit 223 of the conversion control circuit 203 includes plural COT circuits 22_1~22_N which are configured to generate a plurality of the PWM signals Spwm1~SpwmN respectively. In this embodiment, the PWM control logic 24 is configured to generate a plurality of PWM trigger signals Str1~StrN according to the PWM trigger signal Str, to sequentially trigger the PWM signal Spwm1~SpwmN. Note that, the phase number N mentioned above and the following is a positive integer.

Figure 6B:
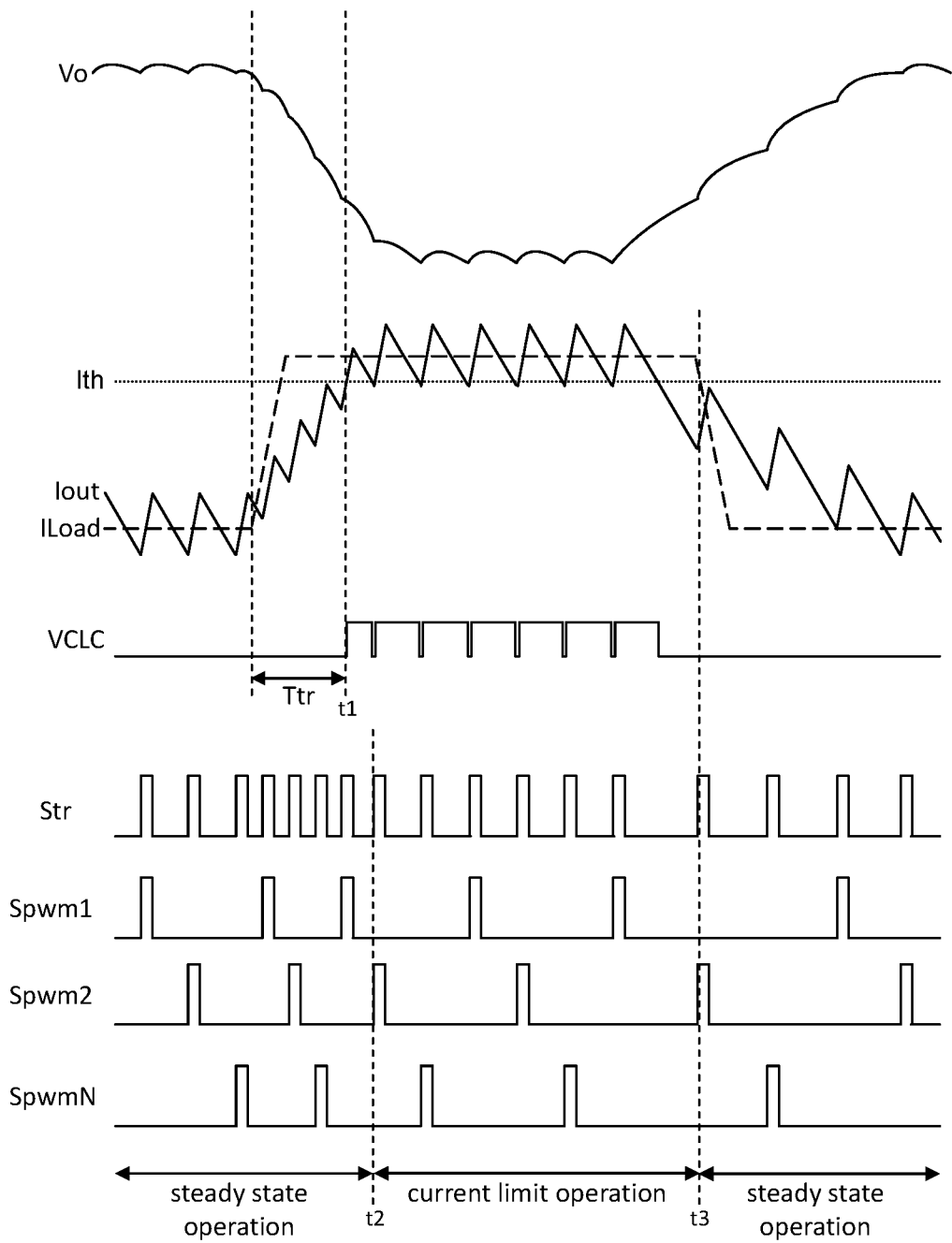
FIG. 6B shows waveforms corresponding to the switching power converter shown in FIG. 6A according to the embodiment of the present invention.

FIG. 6B shows waveforms corresponding to the switching power converter shown in FIG. 6A according to the embodiment of the present invention. In FIG. 6B, the output current Iout increases as the load current ILoad, when the output current Iout exceeds the current limit threshold Ith (at t1), the current limit control signal VCLC intervenes the original PWM feedback control loop and the PWM signals Spwm1~SpwmN are adjusted according to the adjusting signal Vadj. More specifically, the PWM signals Spwm1~SpwmN are adjusted to operate in the fixed frequency during current limit operation (t2~t3) by the adjusting circuit 12 and the PWM control logic 24, to avoid consecutive PWM trigger that causes large output voltage ripple. When the output current Iout reduces to lower than current limit threshold Ith (at t3), current limit is released by the determining circuit 13.

Please refer to FIG. 3 and FIG. 6B. During a transient (Ttr in FIG. 6B) of the output current Iout before exceeding the current limit threshold Ith, the switching frequency fsw is proportional to the output current Iout (as shown in FIG. 3). When the output current Iout exceeds across the current limit threshold Ith, the switching frequency fsw decreases to the fixed frequency fx. In other words, the fixed frequency fx is lower than the switching frequency fsw before the output current Iout exceeds the current limit threshold Ith.

Figure 7:
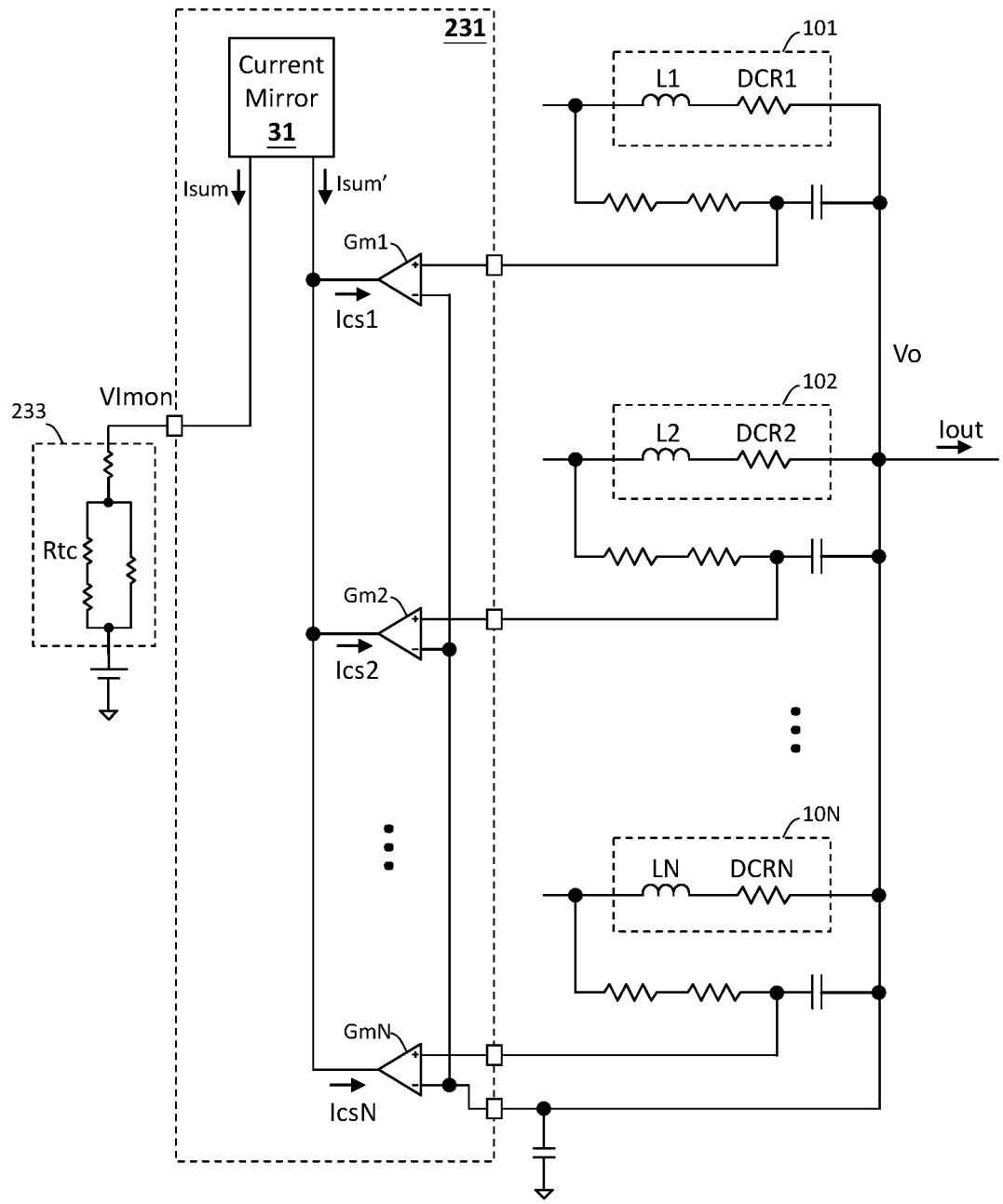
FIG. 7 shows a schematic diagram of one embodiment of the current sense circuit of the switching power converter in FIG. 6A according to the present invention.

FIG. 7 shows a schematic diagram of one embodiment of the current sense circuit of the switching power converter in FIG. 6A according to the present invention. In one embodiment, the current sense circuit 231 includes a current mirror 31 and plural transconductance amplifiers Gm1~GmN. Each of the plural transconductance amplifiers Gm1~GmN is configured to sense the corresponding inductor current of each of the plural power stages 101~10N to generate a per-phase current sense signal. In other words, the plural transconductance amplifiers Gm1~GmN generate a plurality of the per-phase current sense signals Ics1~IcsN respectively.

As shown in FIG. 7, in one embodiment, the current sense circuit 231 further sums up a plurality of the per-phase current sense signals Ics1~IcsN of the plural power stages 101~10N to generate a summed current sense signal Isum through the current mirror 31, for indicating the output current Iout. The summed current sense signal Isum is related to the summed current sense signal Isum'. Each of the inductors L1~LN corresponding to each of the plural power stages 101~10N has a direct current resistance (DCR1~DCRN). In one embodiment, the summed current sense signal Isum' is coupled to a resistor network 233 which includes one single temperature dependent device (Rtc) to generate the current monitor signal VImon, whereby the temperature coefficient of each of the inductors L1~LN of each of the plural power stages 101~10N can be compensated.

Note that, even though the present invention in FIG. 6A includes plural power stages, it needs only one NTC resistor since the temperature coefficient is compensated by the NTC thermistor Rtc, making it easy to realize wide range and high-resolution threshold setting. Another advantage of the present invention is that it requires only one current limit comparator 11 at the current monitor signal VImon and is applicable in common-N sum current structure (each of the negative inputs of the plural transconductance amplifiers Gm1~GmN are all connected, through one single pin for example), which further reduces the die area and costs for achieving current limit function.

Figure 8A:
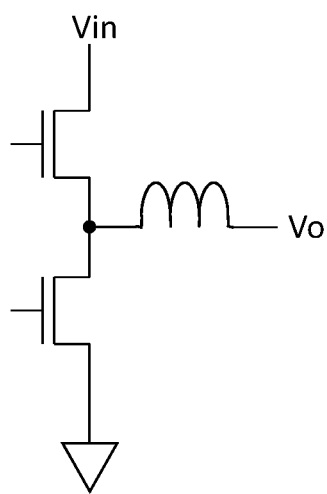
FIG. 8A and FIG. 8B shows schematic diagrams of the embodiments of the power stage of the switching power converter according to the present invention.
Figure 8B:
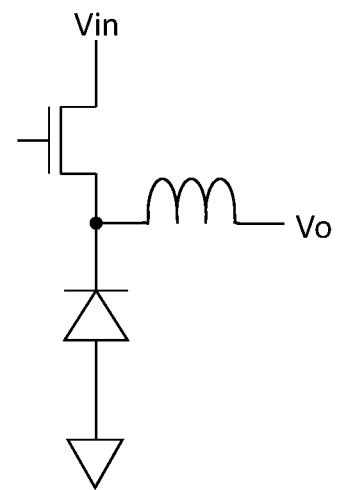

FIG. 8A and FIG. 8B shows schematic diagrams of the embodiments of the power stage of the switching power converter according to the present invention. Note that, the power stage of the present invention is for example but not limited to a buck converter as shown in FIG. 8A or FIG. 8B.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination.

For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A conversion control circuit, configured to operably control a switching power converter to convert an input power to an output power, comprising:
   a current limit control circuit, configured to compare a current monitor signal and a sensing signal limit threshold to generate a current limit control signal, wherein the current monitor signal is related to an output current of the output power; and
   a pulse width modulation (PWM) control circuit, configured to operably generate a PWM signal according to an output voltage of the output power for controlling a power stage to generate the output power, wherein a first state of the PWM signal has a first constant time;
   wherein the current limit control circuit is further configured to operably control a second state of the PWM signal, such that when the current limit control signal indicates that the output current exceeds a current limit threshold, the PWM control circuit controls a switching frequency of the PWM signal to operate at a fixed frequency, wherein the fixed frequency is lower than a predetermined frequency limit;
   wherein the PWM control circuit includes:
   a modulation comparator, configured to operably compare a ramp signal and a first feedback control signal to generate a PWM trigger signal;
   a constant time control circuit, configured to operably count the first constant time for controlling the first state of the PWM signal according to the PWM trigger signal; and
   a feedback control circuit, configured to operably generate a second feedback control signal according to the output voltage;
   wherein the second feedback control signal is adjusted to generate the first feedback control signal such that when the current limit control signal indicates that the output current exceeds the current limit threshold, the switching frequency of the PWM signal operates at the fixed frequency.

2. The conversion control circuit as claimed in claim 1, wherein the current limit control circuit includes:
   an adjusting circuit, configured to operably generate an adjusting signal according to the output voltage and the output current when the output current exceeds the current limit threshold, wherein the first feedback control signal is a sum of the second feedback control signal and the adjusting signal, whereby the second state of the PWM signal is controlled to have a second constant time, such that the switching frequency is at the fixed frequency.

3. The conversion control circuit as claimed in claim 2, further comprising a current sense circuit configured to sense an inductor current of the power stage to generate the current monitor signal;
   wherein the current limit control circuit further includes a current limit comparator which is configured to compare the current monitor signal and the sensing signal limit threshold to generate the current limit control signal.

4. The conversion control circuit as claimed in claim 2, wherein the adjusting signal is proportional to the output voltage and inversely proportional to the output current.

5. The conversion control circuit as claimed in claim 4, wherein the fixed frequency is proportional to the current limit threshold and the output voltage and inversely proportional to an input voltage of the input power and the first constant time.

6. The conversion control circuit as claimed in claim 4, wherein the switching frequency, during a transient of the output current before exceeding the current limit threshold, is proportional to the output current.

7. The conversion control circuit as claimed in claim 6, wherein when the output current exceeds across the current limit threshold, the switching frequency decreases to the fixed frequency.

8. The conversion control circuit as claimed in claim 2, wherein the switching power converter is a multi-phase power converter which includes plural power stages switching in interleaving with each other, wherein each of the plural power stages includes an inductor for switching power conversion;
   wherein the output current is determined by a summed current of an inductor current of each of the plural power stages.

9. The conversion control circuit as claimed in claim 8, wherein the current limit control circuit further includes a current sense circuit, configured to sense the inductor current of each of the plural power stages to generate a plurality of per-phase current sense signals;
   wherein the current sense circuit further sums up the plurality of the per-phase current sense signals of the plural power stages to generate a summed current sense signal;
   wherein the summed current sense signal is coupled to one single temperature dependent device to generate the current monitor signal, whereby a temperature coefficient of the inductor of each of the plural power stages is compensated.

10. A switching power converter, configured to operably convert an input power to an output power, comprising:
    a power stage including at least one switch configured to control an inductor; and
    a conversion control circuit including:
    a current limit control circuit, configured to compare a current monitor signal and a sensing signal limit threshold to generate a current limit control signal, wherein the current monitor signal is related to an output current of the output power; and
    a pulse width modulation (PWM) control circuit, configured to operably generate a PWM signal according to an output voltage of the output power for controlling the power stage to generate the output power, wherein a first state of the PWM signal has a first constant time;
    wherein when the current limit control signal indicates that the output current exceeds a current limit threshold, the PWM control circuit controls a switching frequency of the PWM signal to operate at a fixed frequency, wherein the fixed frequency is lower than a predetermined frequency limit-;
    wherein the PWM control circuit includes:
    a modulation comparator, configured to operably compare a ramp signal and a first feedback control signal to generate a PWM trigger signal;

a constant time control circuit, configured to operably count the first constant time for controlling the first state of the PWM signal according to the PWM trigger signal; and a feedback control circuit, configured to operably generate a second feedback control signal according to the output voltage;

wherein the second feedback control signal is adjusted to generate the first feedback control signal such that when the current limit control signal indicates that the output current exceeds the current limit threshold, the switching frequency of the PWM signal operates at the fixed frequency.

11. The switching power converter as claimed in claim 10, wherein the current limit control circuit includes:

an adjusting circuit, configured to operably generate an adjusting signal according to the output voltage and the output current when the output current exceeds the current limit threshold, wherein the first feedback control signal is a sum of the second feedback control signal and the adjusting signal, whereby a second state of the PWM signal is controlled to have a second constant time, such that the switching frequency is at the fixed frequency.

12. The switching power converter as claimed in claim 11, wherein the conversion control circuit further includes a current sense circuit configured to sense an inductor current of the power stage to generate the current monitor signal;

wherein the current limit control circuit further includes a current limit comparator which is configured to compare the current monitor signal and the sensing signal limit threshold to generate the current limit control signal.

13. The switching power converter as claimed in claim 11, wherein the adjusting signal is proportional to the output voltage and inversely proportional to the output current.

14. The switching power converter as claimed in claim 13, wherein the fixed frequency is proportional to the current limit threshold and the output voltage and inversely proportional to an input voltage of the input power and the first constant time.

15. The switching power converter as claimed in claim 13, wherein the switching frequency, during a transient of the output current before exceeding the current limit threshold, is proportional to the output current.

16. The switching power converter as claimed in claim 15, wherein when the output current exceeds across the current limit threshold, the switching frequency decreases to the fixed frequency.

17. The switching power converter as claimed in claim 11, wherein the switching power converter is a multi-phase power converter which comprises plural power stages switching in interleaving with each other, wherein each of the plural power stages includes an inductor for switching power conversion;

wherein the output current is determined by a summed current of an inductor current of each of the plural power stages.

18. The switching power converter as claimed in claim 17, wherein the current limit control circuit further includes a current sense circuit, configured to sense the inductor current of each of the plural power stages to generate a plurality of per-phase current sense signals;

wherein the current sense circuit further sums up the plurality of the per-phase current sense signals of the plural power stages to generate a summed current sense signal;

wherein the summed current sense signal is coupled to one single temperature dependent device to generate the current monitor signal, whereby a temperature coefficient of the inductor of each of the plural power stages is compensated.

19. A method for controlling a switching power converter, wherein the switching power converter is configured to operably convert an input power to an output power and includes a power stage including at least one switch configured to control an inductor; the method comprising:

comparing a current monitor signal and a sensing signal limit threshold to generate a current limit control signal, wherein the current monitor signal is related to an output current of the output power; and generating a PWM signal according to an output voltage of the output power for controlling the power stage to generate the output power, wherein a first state of the PWM signal has a first constant time;

wherein when the current limit control signal indicates that the output current exceeds a current limit threshold, controlling a switching frequency of the PWM signal to operate at a fixed frequency, wherein the fixed frequency is lower than a predetermined frequency limit;

wherein the step of generating a PWM signal includes:

comparing a ramp signal and a first feedback control signal to generate a PWM trigger signal;

counting the first constant time for controlling the first state of the PWM signal according to the PWM trigger signal; and generating a second feedback control signal according to the output voltage;

wherein the first feedback control signal is generated by adjusting the second feedback control signal.

20. The method as claimed in claim 19, further comprising:

generating an adjusting signal according to the output voltage and the output current when the output current exceeds the current limit threshold, wherein the first feedback control signal is a sum of the second feedback control signal and the adjusting signal, whereby a second state of the PWM signal is controlled to have a second constant time, such the fixed that the switching frequency is at frequency.

21. The method as claimed in claim 20, further comprising:

sensing an inductor current of the power stage to generate the current monitor signal.

22. The method as claimed in claim 20, wherein the adjusting signal is proportional to the output voltage and inversely proportional to the output current.

23. The method as claimed in claim 22, wherein the fixed frequency is proportional to the current limit threshold and the output voltage and inversely proportional to an input voltage of the input power and the first constant time.

24. The method as claimed in claim 22, wherein the switching frequency, during a transient of the output current before exceeding the current limit threshold, is proportional to the output current.

25. The method as claimed in claim 24, wherein when the output current exceeds across the current limit threshold, the switching frequency decreases to the fixed frequency.

26. The method as claimed in claim 20,
wherein the switching power converter is a multi-phase power converter which includes plural power stages switching in interleaving with each other, wherein each of the plural power stages includes an inductor for switching power conversion;
wherein the output current is determined by a summed current of an inductor current of each of the plural power stages.

27. The method as claimed in claim 26, further comprising:
sensing the inductor current of each of the plural power stages to generate a plurality of per-phase current sense signals;
summing up the plurality of the per-phase current sense signals of the plural power stages to generate a summed current sense signal; and
compensating a temperature coefficient of the inductor of each of the plural power stages by coupling the summed current sense signal to one single temperature dependent device.

\* \* \* \* \*